(12) United States Patent
Gruen et al.

(10) Patent No.: US 10,169,017 B2
(45) Date of Patent: Jan. 1, 2019

(54) CROWDSOURCING LOCATION BASED APPLICATIONS AND STRUCTURED DATA FOR LOCATION BASED APPLICATIONS

(75) Inventors: Daniel M Gruen, Newton, MA (US); Susanne Hupfer, Lexington, MA (US); Stephen E Levy, Saskatoon (CA); Michael Muller, Medford, MA (US); Kyle T Nichols-Schmolze, Somerville, MA (US); Larissa Pschetz, Picarras (BR); Fyodor Wolf, Belmont, MA (US)

(73) Assignee: International Business Machines Corporation, Armonk, NY (US)

( * ) Notice: Subject to any disclaimer, the term of this patent is extended or adjusted under 35 U.S.C. 154(b) by 1683 days.

(21) Appl. No.: 12/909,181

(22) Filed: Oct. 21, 2010

(65) Prior Publication Data

US 2012/0102165 A1 Apr. 26, 2012

(51) Int. Cl.
*G06F 8/60* (2018.01)
(52) U.S. Cl.
CPC ..................... *G06F 8/60* (2013.01)
(58) Field of Classification Search
CPC ..... H04N 21/812; G06F 3/0481; G06F 15/16; G06F 8/60; H04L 51/32; H04L 65/60
USPC ................ 709/217, 222, 226, 246
See application file for complete search history.

(56) References Cited

U.S. PATENT DOCUMENTS

| | | | | |
|---|---|---|---|---|
| 5,261,042 A | * | 11/1993 | Brandt | G06F 9/4443 715/841 |
| 5,600,778 A | * | 2/1997 | Swanson | G06F 3/033 715/762 |
| 5,603,034 A | * | 2/1997 | Swanson | G06F 9/452 717/111 |
| 5,844,554 A | * | 12/1998 | Geller | G06F 8/34 715/744 |
| 6,208,340 B1 | * | 3/2001 | Amin | G06F 1/1626 715/808 |
| 6,300,948 B1 | * | 10/2001 | Geller | G06F 8/34 715/744 |
| 6,385,458 B1 | * | 5/2002 | Papadimitriou | H04W 4/02 455/432.2 |
| 6,982,733 B1 | * | 1/2006 | McNally | G06F 17/30905 707/E17.121 |
| 7,254,569 B2 | * | 8/2007 | Goodman | G06F 17/243 |
| 7,660,779 B2 | * | 2/2010 | Goodman | G06F 17/243 706/18 |

(Continued)

*Primary Examiner* — Daniel C. Murray
(74) *Attorney, Agent, or Firm* — Steven M. Greenberg, Esq.; Shutts & Bowen LLP

(57) ABSTRACT

Embodiments of the present invention provide a method, system and computer program product for deploying a location based applications providing crowdsourced structured points of input for data entry. In an embodiment of the invention, a method for deploying a location based application providing crowdsourced structured points of input for data entry includes the selection of a location based application component, such as a map, for inclusion in a deployable application and the definition of a point of input for the location based application component. In this regard, the point of input can include at least one user interface control accepting data input of structured data. Finally the deployable application can be uploaded to a deployable application repository over a computer communications network for deployment to requesting mobile devices over the computer communications network.

12 Claims, 2 Drawing Sheets

(56) References Cited

U.S. PATENT DOCUMENTS

| | | | | |
|---|---|---|---|---|
| 7,705,723 B2* | 4/2010 | Kahn | G06F 19/3493 | 340/521 |
| 7,848,765 B2* | 12/2010 | Phillips | G08B 21/0236 | 455/404.2 |
| 7,865,308 B2* | 1/2011 | Athsani | G06F 17/30241 | 701/457 |
| 8,049,614 B2* | 11/2011 | Kahn | G06F 19/3493 | 340/521 |
| 8,072,954 B2* | 12/2011 | Shen | H04W 4/02 | 342/385 |
| 8,099,332 B2* | 1/2012 | Lemay | G06F 8/61 | 705/26.1 |
| 8,108,414 B2* | 1/2012 | Stackpole | G06F 17/3087 | 707/758 |
| 8,146,077 B2* | 3/2012 | McNally | G06F 17/30905 | 715/810 |
| 8,275,394 B2* | 9/2012 | Mattila | G06F 3/0481 | 455/456.1 |
| 8,326,315 B2* | 12/2012 | Phillips | G08B 21/0236 | 348/552 |
| 8,364,173 B2* | 1/2013 | Mattila | G06F 3/0481 | 455/456.1 |
| 8,467,955 B2* | 6/2013 | Jiang | G01C 21/20 | 340/988 |
| 8,548,503 B2* | 10/2013 | Oh | H04L 12/1818 | 455/414.2 |
| 8,554,770 B2* | 10/2013 | Purdy | G06Q 30/0204 | 455/456.1 |
| 8,559,931 B2* | 10/2013 | Moon | H04W 4/001 | 455/414.2 |
| 8,571,999 B2* | 10/2013 | Crawford | H04L 67/24 | 705/319 |
| 8,599,203 B2* | 12/2013 | Horowitz | G06T 11/206 | 345/440 |
| 8,645,359 B2* | 2/2014 | Heimendinger | G06F 17/30047 | 707/722 |
| 8,694,577 B2* | 4/2014 | D'Angelo | G06Q 10/10 | 705/1.1 |
| 8,813,107 B2* | 8/2014 | Higgins | H04N 7/173 | 725/10 |
| 8,832,233 B1* | 9/2014 | Brin | H04L 29/06476 | 709/203 |
| 8,843,515 B2* | 9/2014 | Burris | G06F 17/3087 | 707/769 |
| 8,862,150 B2* | 10/2014 | Phillips | G08B 21/0236 | 455/404.2 |
| 8,866,750 B2* | 10/2014 | Bentsen | G06F 3/03547 | 345/173 |
| 8,886,718 B2* | 11/2014 | D'Angelo | G06Q 10/10 | 705/1.1 |
| 8,893,010 B1* | 11/2014 | Brin | H04L 29/06476 | 715/738 |
| 8,909,248 B2* | 12/2014 | Phillips | G08B 21/0236 | 455/404.2 |
| 8,914,228 B2* | 12/2014 | Hardy | G01C 21/26 | 340/995.14 |
| 8,914,472 B1* | 12/2014 | Lee | H04L 29/06476 | 709/205 |
| 8,934,015 B1* | 1/2015 | Chi | H04L 29/06476 | 348/158 |
| 9,015,245 B1* | 4/2015 | Lee | H04L 29/06476 | 709/203 |
| 9,053,169 B2* | 6/2015 | Purdy | G06Q 30/0204 | |
| 9,119,027 B2* | 8/2015 | Sharon | G06F 21/6245 | |
| 9,128,800 B2* | 9/2015 | D'Angelo | G06Q 10/10 | |
| 9,129,303 B2* | 9/2015 | Crawford | H04L 67/24 | |
| 9,129,304 B2* | 9/2015 | Crawford | H04L 67/24 | |
| 9,147,201 B2* | 9/2015 | Crawford | H04L 67/24 | |
| 9,154,561 B2* | 10/2015 | Oh | H04L 12/1818 | |
| 9,282,446 B2* | 3/2016 | Moshfeghi | G06Q 30/02 | |
| 9,584,606 B2* | 2/2017 | Kao | H04L 67/18 | |
| 9,654,923 B2* | 5/2017 | Phillips | H04W 4/021 | |
| 9,668,096 B2* | 5/2017 | Philips | H04W 4/021 | |
| 2002/0120555 A1* | 8/2002 | Lerner | G06Q 30/0283 | 705/37 |
| 2003/0225683 A1* | 12/2003 | Hill | G06Q 10/06 | 705/37 |
| 2004/0015837 A1* | 1/2004 | Worthington | G06F 17/3089 | 717/107 |
| 2004/0162830 A1* | 8/2004 | Shirwadkar | G06F 17/3087 | |
| 2005/0204308 A1* | 9/2005 | McNally | G06F 17/30905 | 715/810 |
| 2005/0257134 A1* | 11/2005 | Goodman | G06F 17/243 | 715/226 |
| 2005/0257148 A1* | 11/2005 | Goodman | G06F 17/243 | 715/226 |
| 2006/0270421 A1* | 11/2006 | Phillips | G08B 21/0236 | 455/457 |
| 2007/0030824 A1* | 2/2007 | Ribaudo et al. | | 370/328 |
| 2007/0229290 A1* | 10/2007 | Kahn | G06F 19/3493 | 340/573.4 |
| 2007/0236472 A1* | 10/2007 | Bentsen | G06F 3/03547 | 345/173 |
| 2007/0244633 A1* | 10/2007 | Phillips | G08B 21/0236 | 701/408 |
| 2008/0040028 A1* | 2/2008 | Crump | G06F 17/30241 | 701/532 |
| 2008/0040678 A1* | 2/2008 | Crump | G06F 3/0481 | 715/763 |
| 2008/0040684 A1* | 2/2008 | Crump | G06F 3/0482 | 715/808 |
| 2008/0140650 A1* | 6/2008 | Stackpole | G06F 17/3087 | |
| 2008/0168340 A1* | 7/2008 | Jang | G06F 17/30126 | 715/206 |
| 2008/0214209 A1* | 9/2008 | Ratnakar | H04W 4/02 | 455/456.1 |
| 2008/0255754 A1* | 10/2008 | Pinto | | 701/119 |
| 2009/0024317 A1* | 1/2009 | Aase | G01C 21/00 | 701/533 |
| 2009/0031301 A1* | 1/2009 | D'Angelo | G06Q 10/10 | 717/178 |
| 2009/0070412 A1* | 3/2009 | D'Angelo | G06Q 10/10 | 709/203 |
| 2009/0112467 A1* | 4/2009 | Jiang | G01C 21/20 | 701/431 |
| 2009/0160859 A1* | 6/2009 | Horowitz | G06T 11/206 | 345/440 |
| 2009/0171939 A1* | 7/2009 | Athsani | G06F 17/30241 | |
| 2009/0241040 A1* | 9/2009 | Mattila | G06F 3/0481 | 715/760 |
| 2009/0292626 A1* | 11/2009 | Oxford | G06Q 30/06 | 705/26.1 |
| 2009/0312033 A1* | 12/2009 | Shen | H04W 4/02 | 455/456.1 |
| 2009/0328087 A1* | 12/2009 | Higgins | H04N 7/173 | 725/10 |
| 2010/0035596 A1* | 2/2010 | Nachman et al. | | 455/418 |
| 2010/0056183 A1* | 3/2010 | Oh | H04L 12/1818 | 455/456.3 |
| 2010/0082239 A1* | 4/2010 | Hardy | G01C 21/26 | 701/532 |
| 2010/0238023 A1* | 9/2010 | Kahn | G06F 19/3493 | 340/539.13 |
| 2010/0241623 A1* | 9/2010 | Acker | G06F 17/3087 | 707/724 |
| 2010/0299436 A1* | 11/2010 | Khalid et al. | | 709/226 |
| 2011/0035284 A1* | 2/2011 | Moshfeghi | G06Q 30/02 | 705/14.58 |
| 2011/0083101 A1* | 4/2011 | Sharon | G06F 21/6245 | 715/800 |
| 2011/0105150 A1* | 5/2011 | Moon | H04W 4/001 | 455/456.3 |
| 2011/0173559 A1* | 7/2011 | Schaefer, IV | G06F 17/3089 | 715/780 |
| 2012/0046017 A1* | 2/2012 | Jennings | G06Q 30/0204 | 455/414.1 |
| 2012/0046068 A1* | 2/2012 | Katpelly | G06Q 30/0204 | 455/550.1 |

(56) References Cited

U.S. PATENT DOCUMENTS

| | | | |
|---|---|---|---|
| 2012/0046995 A1* | 2/2012 | Petersen | G06Q 30/0204 705/7.33 |
| 2012/0047152 A1* | 2/2012 | Purdy | G06Q 30/0204 707/754 |
| 2012/0047184 A1* | 2/2012 | Purdy | G06Q 30/0204 707/803 |
| 2012/0047448 A1* | 2/2012 | Amidon | G06Q 30/0204 715/753 |
| 2012/0047565 A1* | 2/2012 | Petersen | G06Q 30/0204 726/7 |
| 2012/0066287 A1* | 3/2012 | Hajost | 709/203 |
| 2012/0126974 A1* | 5/2012 | Phillips | G08B 21/0236 340/539.13 |
| 2012/0129553 A1* | 5/2012 | Phillips | G08B 21/0236 455/456.3 |
| 2012/0231816 A1* | 9/2012 | Kubo | G06F 17/3087 455/456.3 |
| 2012/0304115 A1* | 11/2012 | Mattila | G06F 3/0481 715/802 |
| 2013/0013689 A1* | 1/2013 | Crawford | H04L 67/24 709/204 |
| 2013/0198788 A1* | 8/2013 | Barger | H04N 21/2668 725/93 |
| 2013/0238599 A1* | 9/2013 | Burris | G06F 17/3087 707/722 |
| 2013/0238652 A1* | 9/2013 | Burris | G06F 17/3087 707/769 |
| 2013/0238658 A1* | 9/2013 | Burris | G06F 17/30545 707/770 |
| 2013/0268558 A1* | 10/2013 | Burris | G06F 17/30545 707/770 |
| 2013/0282282 A1* | 10/2013 | Jiang | G01C 21/20 701/533 |
| 2013/0283187 A1* | 10/2013 | Laird-McConnell | G06F 17/30165 715/748 |
| 2014/0019552 A1* | 1/2014 | Oh | H04L 12/1818 709/204 |
| 2014/0089296 A1* | 3/2014 | Burris | G06F 17/30545 707/722 |
| 2014/0089343 A1* | 3/2014 | Burris | G06F 17/30864 707/770 |
| 2014/0095516 A1* | 4/2014 | Purdy | G06Q 30/0204 707/749 |
| 2014/0108140 A1* | 4/2014 | Crawford | H04L 67/24 705/14.53 |
| 2014/0108518 A1* | 4/2014 | D'Angelo | G06Q 10/10 709/203 |
| 2014/0108536 A1* | 4/2014 | Crawford | H04L 67/24 709/204 |
| 2014/0108537 A1* | 4/2014 | Crawford | H04L 67/24 709/204 |
| 2014/0108539 A1* | 4/2014 | Crawford | H04L 67/24 709/204 |
| 2014/0108540 A1* | 4/2014 | Crawford | H04L 67/24 709/204 |
| 2015/0009148 A1* | 1/2015 | Bentsen | G06F 3/03547 345/167 |
| 2015/0058743 A1* | 2/2015 | Wall | G06F 17/30864 715/744 |
| 2015/0065177 A1* | 3/2015 | Phillips | G08B 21/0236 455/456.3 |
| 2015/0066901 A1* | 3/2015 | Burris | G06F 17/30867 707/722 |
| 2015/0066916 A1* | 3/2015 | Burris | G06Q 50/01 707/723 |
| 2015/0113017 A1* | 4/2015 | Burris | G06F 17/3087 707/769 |
| 2015/0148078 A1* | 5/2015 | Phillips | G08B 21/0236 455/456.3 |
| 2015/0163632 A1* | 6/2015 | Phillips | G08B 21/0236 455/456.3 |
| 2015/0304253 A1* | 10/2015 | Lee | H04L 29/06476 709/206 |
| 2015/0319590 A1* | 11/2015 | Sharon | G06F 21/6245 455/456.3 |
| 2015/0350349 A1* | 12/2015 | Kao | H04L 67/18 709/204 |
| 2016/0021200 A1* | 1/2016 | Oh | H04L 12/1818 455/416 |
| 2017/0126819 A1* | 5/2017 | Kao | H04L 67/18 |

* cited by examiner

CROWDSOURCING LOCATION BASED APPLICATIONS AND STRUCTURED DATA FOR LOCATION BASED APPLICATIONS

BACKGROUND OF THE INVENTION

Field of the Invention

The present invention relates to mobile device computing and more particularly to location based application deployment for mobile device computing.

Description of the Related Art

Mobile device computing pertains to the use of a mobile device such as a "smart phone" or personal digital assistant to perform computing tasks in a fashion similar to that of a personal computer. Indeed, the distinction between personal computer and mobile computing device has become blurred as the power of the mobile computing device in the marketplace today exceeds that of the personal computer just a few years ago. However, the manner in which applications are deployed to the mobile computing device often differs from the manner in which applications are deployed to the personal computer. In this regard, while the personal computer generally enjoys carte blanche in selecting applications for deployment, mobile computing devices often are dependent upon remote computing repositories controlled by an administrative entity charged with limiting the type, nature and arrangement of mobile computing applications to be deployed to one or more mobile computing devices grouped in a network of mobile computing devices.

Classically, mobile device computing provides for an extension of conventional personal computing. Specifically, within the enterprise and even in the circumstance of the individual, users of the mobile computing device utilize applications that supplement more robust applications deployed at the desktop. Examples include lightweight remote messaging clients, remote forms based data collection applications, and lightweight portal views to server stored data. Yet, users of the mobile computing device also utilize applications that capitalize on the natural ability of the mobile computing device to recognize a contemporaneous geographic location through geographic positioning system (GPS) technology, or geo-positioning data derived from a mobile telephony signal or the base station with which a mobile device communicates. Examples include mapping and navigation applications, and even newer social media applications that share the contemporaneous location of peers in a social network.

Of note, in both the desktop computing paradigm and in the mobile device computing paradigm, application deployment depends upon an ability to access a remote repository of pre-stored and cataloged applications. Whereas in the desktop environment, the end user also can deploy an application to the desktop through the use of physical media like a disc, the user of the mobile computing device largely is limited to the retrieval of a desired application over the computer communications network from a remote repository. In the latter circumstance, the end user is further limited to those applications pre-assembled and arranged for distribution.

Recent advances in mobile computing do allow a degree of customization of an application once deployed to the mobile computing device. For example, the end user of the mobile computing device can create an ad hoc arrangement of desired data (and not applications) for display in a single portal view--such as by configuring a view to include different, customized really simple syndication (RSS) feeds of data from different sources, or by configuring a view to include different fields of a form for data collection. Still, the end user cannot readily share the resulting portal view with other mobile computing device users. Mobile computing device end users can configure a map to include different points of interest for sharing with other mobile computing device users, however, those maps provide little else other than the customization by the end user once shared.

BRIEF SUMMARY OF THE INVENTION

Embodiments of the present invention address deficiencies of the art in respect to application deployment of location based applications and provide a novel and non-obvious method, system and computer program product for deploying a location based applications providing crowdsourced structured points of input for data entry. In an embodiment of the invention, a method for deploying a location based application providing crowdsourced structured points of input for data entry includes the selection of a location based application component, such as a map, for inclusion in a deployable application and the definition of a point of input for the location based application component. In this regard, the point of input can include at least one user interface control accepting data input of structured data. Finally the deployable application can be uploaded to a deployable application repository over a computer communications network for deployment to requesting mobile devices over the computer communications network.

In one aspect of the embodiment, the location based application component can be selected for inclusion in a deployable application by first selecting a template of a pre-determined arrangement of location based application components and subsequently modifying the pre-determined arrangement in the template to include a different arrangement of application components. In another aspect of the embodiment, the definition of a point of input for the location based application component can include defining a drop down box accepting data input from amongst a list of pre-defined choices of structured data. In even yet another aspect of the embodiment, the definition of a point of input for the location based application component can include defining a set of radio buttons accepting data input from amongst a list of pre-defined choices of structured data.

In any event, once uploaded to the repository, a deployable application can be deployed from the repository to different requesting mobile devices. Thereafter, data input of structured data can be received for a point of input in the deployable application from the different requesting mobile devices over the computer communications network. Further, the received data can be stored in a data store as crowdsourced data for the deployable application.

In another embodiment of the invention, an application deployment data processing system can be configured for the deployment of location based applications providing crowdsourced structured points of input for data entry. The system can include a computer with at least one processor and memory, a host server coupled to the computer over a computer communications network and a deployable application repository accessible through the host server. The system also can include an application deployment module executing in the memory of the computer. The module can include program code enabled upon executing in the computer to select a location based application component for inclusion in a deployable application, to define a point of input for the location based application component, and to upload the deployable application to the deployable application repository for deployment to requesting mobile devices over the computer communications network.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the deployment of location based applications providing crowdsourced location based application components and structured points of input for data entry. In accordance with an embodiment of the invention, one or more location based application components and one or more corresponding points of input can be defined for a deployable application. Each location based component can provide logic processing geographic data received contemporaneously in a mobile computing device, such as a map or point of interest on a map. The point of input in turn can be a user interface control associated with a corresponding application component and permitting input of structured data in respect to the corresponding application component, for example a text field, a set of radio buttons or a list of choices from a drop-down box.

Thereafter, the deployable application can be uploaded to a server for deployment to requesting mobile computing devices. Once deployed to a requesting mobile computing device, geographic data can be obtained in the mobile computing device and processed by each application component. Further, each point of input can be rendered in association with a corresponding application component and structured data can be received for each point of input in the mobile computing device. Finally, the structured data can be uploaded to a remote data store from the mobile computing device so as to aggregate crowdsourced data for the deployable application.

Figure 1:
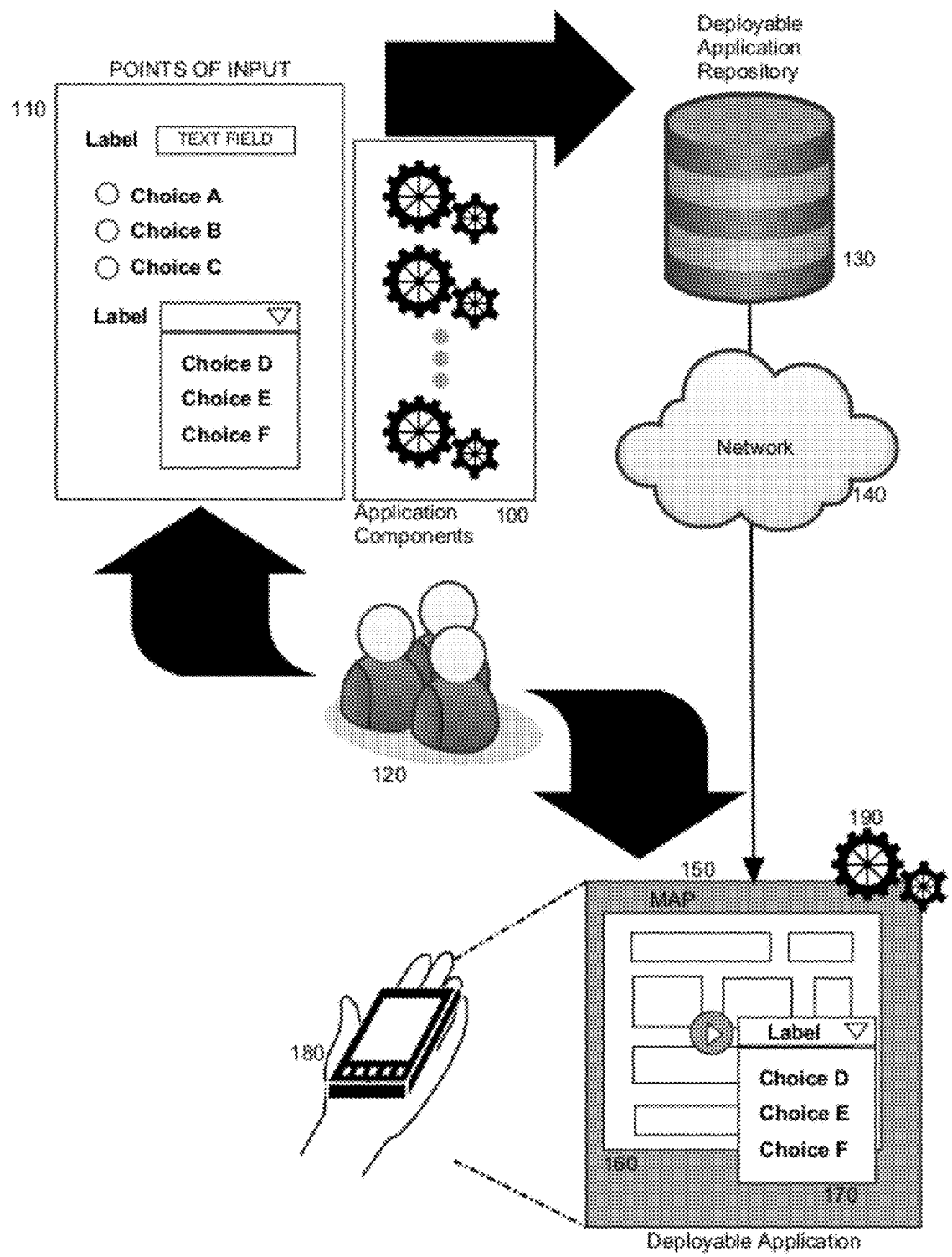
FIG. 1 is a pictorial illustration of a process for the deployment of location based applications providing crowdsourced structured points of input for data entry.

In further illustration, FIG. 1 is a pictorial illustration of a process for the deployment of location based applications providing crowdsourced structured points of input for data entry. As shown in FIG. 1, different end users 120 can select different application components 100 in different arrangements to be incorporated into a deployable mobile application. The application components 100 can be location based application components including logic processing location based data such as GPS coordinates. The end users 120 further can define for the deployable application one or more points of input 110 for association with corresponding selected ones of the application components 100. The points of input 110 can provide for the input of structured data through a suitable user interface control, such as a text field, set of radio buttons, or drop down box of selectable choices, to name only a few examples.

Thereafter, the deployable application can be uploaded to a deployable application repository 130 from which the deployable application can be downloaded and consumed by others of the end users 120 from over a computer communications network 140 such as the global Internet. Once deployed to a mobile device 180, a deployable application 150 can provide a display of both the included application components 190 (only a single component shown for ease of illustration) and also one or more points of input 170 specified for the deployable application 150. In this regard, a map 160 can be displayed in concert with the application component 190 and a corresponding point of input 170 can be rendered for a portion of the map 160 through which data can be input through the point of input 170.

The input data provided through the point of input 170 subsequently can be transmitted to a data store (not shown) for aggregation with other data input for the point of input 170 by others of the end users 120 who have downloaded and utilized the deployable application 150. In this way, not only will the deployable application have been crowdsourced through the arrangement of application components 100 and points of input 110, but also the data collected through the points of input 110 once deployed as part of a deployable application can be crowdsourced.

Figure 2:
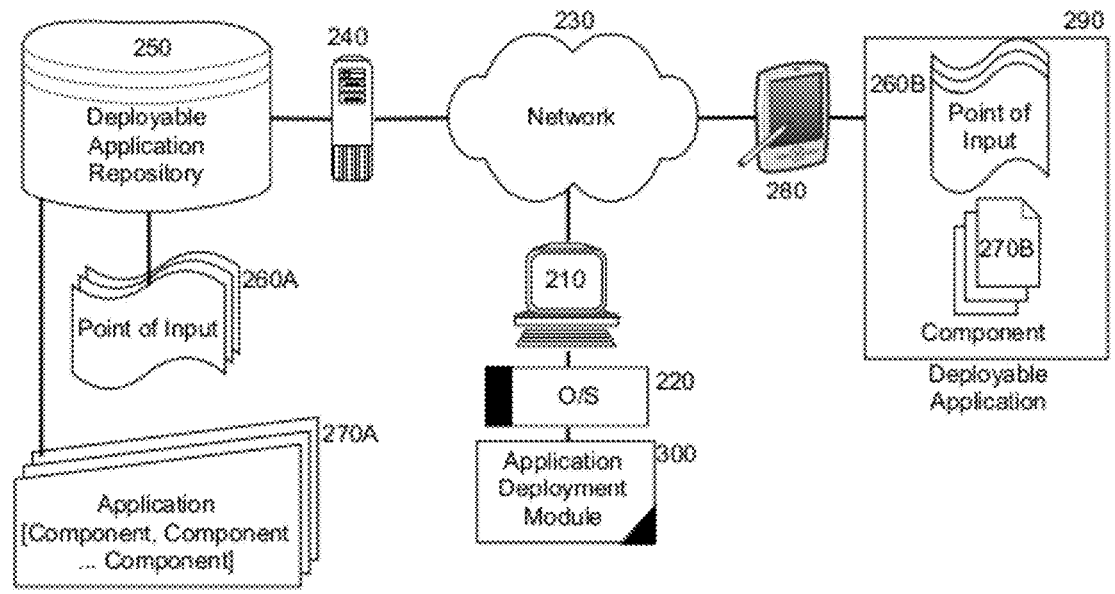
FIG. 2 is a schematic illustration of an application deployment data processing system configured for the deployment of location based applications providing crowdsourced structured points of input for data entry; and, FIG. 3 is a flow chart illustrating a process for the deployment of location based applications providing crowdsourced structured points of input for data entry.

The process described in connection with FIG. 1 can be implemented in an application deployment data processing system. In yet further illustration, FIG. 2 schematically shows an application deployment data processing system configured for the deployment of location based applications providing crowdsourced structured points of input for data entry. The system can include a host server 240 configured for communicative coupling to both a computer 210 and also multiple different mobile devices 280 over computer communications network 230. The host server 240 can include a deployable application repository 250 including different deployable applications 270A that each include an arrangement of application components and also one or more points of input 260 selected and configured for use in connection with a corresponding one of the application components of the deployable application 270.

The computer 210, in turn, can include an operating system 220 hosting the execution of an application deployment module 300. The application deployment module 300 can include program code that when executed in memory of the computer 210 through the operating system 220 can provide a user interface through when different points of input 260 can be configured and associated with different application components selected for inclusion in a deployable application 270A. The program code of the application deployment module 300 further when executed by the computer 210 can provide a user interface through which the deployable application 270A can be titled, described and uploaded to the deployable application repository 250 for ultimate distribution over the computer communications network 230 to requesting ones of the mobile devices 280.

In this regard, each of the mobile devices 280 can include a computing environment through which a deployable application 290 can be retrieved from the deployable application repository 250 for execution in the mobile device 280. The deployable application 290 can include one or more application components 270B and one or more points of input 260B each corresponding to a different one of the application components 270B included as part of the deployable application 290. Each of the points of input 260B in turn can be configured to return collected data to a remote data store (not shown) over the computer communications network 230. In this way, not only will the deployable application 290 have been crowdsourced through the arrangement of application components 270B and points of input 260B, but also the data collected through the points of input 260B once deployed as part of the deployable application 290 can be crowdsourced.

Figure 3:
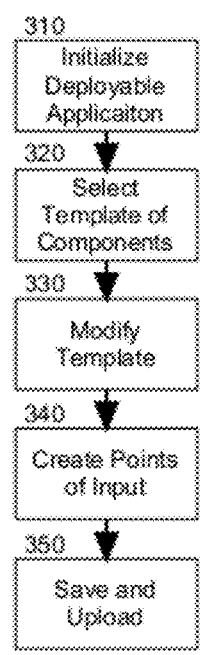

In even yet further illustration of the operation of the application deployment module 300, FIG. 3 is a flow chart illustrating a process for the deployment of location based applications providing crowdsourced structured points of input for data entry. Beginning in block 310, a deployable application can be initialized and a title and description can be applied to the deployable application. In block 320, different application components can be selected for inclusion in the deployable application from amongst a catalog of application components. Alternatively, a template of pre-arranged application components can be selected and optionally modified in block 330 to arrive at a selection of application components for inclusion in the deployable application.

In block 340, one or more points of input can be created using one or more user interface controls pre-defined to collect structured data. Each of the points of input can be associated with an application component selected for inclusion in the deployable application. For instance, a user interface control for a point of input can be associated with a particular portion of a map included as part of a corresponding application component and can be configured to collect data for that portion of the map, such as a rating, an environmental condition, and other such data ancillary to the actual geographic coordinates of the portion of the map. Once the arrangement of application components and corresponding points of input have been defined for the deployable application, in block 350 the deployable application can be uploaded to a repository of deployable applications.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

We claim:

1. A method for deploying a location based applications providing crowdsourced structured points of input for data entry, the method comprising:
   selecting different combinations of different location based application components by different end users from over a computer communications network in order to define a different deployable application for each of the different end users;
   storing by each of the different end users, a corresponding one of the different deployable applications in a deployable application repository from which each deployable application is downloaded and consumed by others of the different end users and associating during the storing, a map with a corresponding one of the location based components in each deployable application for each corresponding one of the different end users;
   defining for each map, a point of input into which structured data defined by the point of input as being a pre-defined selection of selectable data is received in connection with a single location on the map irrespective of a particular one of the combinations of the different location based components of an associated one of the different deployable applications;
   deploying each deployable application to a corresponding one of the different end users; and,
   subsequent to the deploying of each deployable application to a corresponding one of the different one of the end users, in each one of the deployable applications that has been deployed to a corresponding one of the different one of the end users, receiving from a corresponding one of the different end users, a selection through the point of input of one of the selectable data presented in connection with the single location on the map and aggregating each selection by each corresponding one of the different end users in a repository in association with the single location on the map and thereafter, in response to a request by a new one of the different end users to deploy a particular one of the deployable applications to a mobile device of the new one of the different end users, deploying the particular one of the deployable applications with the single location on the map and all aggregated selections of the selectable data from others of the different end users as stored in connection with the deployable application.

2. The method of claim 1, further comprising:
   selecting a template of a pre-determined arrangement of location based application components; and,
   modifying the pre-determined arrangement in the template to include a different arrangement of location based application components.

3. The method of claim 1, wherein the point of input includes a drop down box accepting data input from amongst a list of pre-defined choices of structured data.

4. The method of claim 1, wherein the point of input comprises a set of radio buttons accepting data input from amongst a list of pre-defined choices of structured data.

5. An application deployment data processing system configured for the deployment of location based applications providing crowdsourced structured points of input for data entry, the system comprising:
   a computer with at least one processor and memory;
   a host server coupled to the computer over a computer communications network;
   a deployable application repository accessible through the host server; and, an application deployment module executing in the memory of the computer, the application deployment module comprising program code enabled upon executing in the computer:

selecting different combinations of different location based application components by different end users from over a computer communications network in order to define a different deployable application for each of the different end user;

storing by each of the different end users, a corresponding one of the different deployable applications in a deployable application repository from which each deployable application is downloaded and consumed by others of the different end users and associating during the storing, a map with a corresponding one of the location based components in each deployable application for each corresponding one of the different end users;

defining for each map, a point of input into which structured data defined by the point of input as being a pre-defined selection of selectable data is received in connection with a single location on the map irrespective of a particular one of the combinations of the different location based components of an associated one of the different deployable applications;

deploying each deployable application to a corresponding one of the different end users; and, subsequent to the deploying of each deployable application to a corresponding one of the different one of the end users, in each one of the deployable applications that has been deployed to a corresponding one of the different one of the end users, receiving from a corresponding one of the different end users, a selection through the point of input of one of the selectable data presented in connection with the single location on the map and aggregating each selection by each corresponding one of the different end users in a repository in association with the single location on the map and thereafter, in response to a request by a new one of the different end users to deploy a particular one of the deployable applications to a mobile device of the new one of the different end users, deploying the particular one of the deployable applications with the single location on the map and all aggregated selections of the selectable data from others of the different end users as stored in connection with the deployable application.

6. The system of claim 5, wherein the program code further performs:

selecting a template of a pre-determined arrangement of location based application components; and, modifying the pre-determined arrangement in the template to include a different arrangement of location based application components.

7. The system of claim 5, wherein the point of input includes a drop down box accepting data input from amongst a list of pre-defined choices of structured data.

8. The system of claim 5, wherein the point of input comprises a set of radio buttons accepting data input from amongst a list of pre-defined choices of structured data.

9. A computer program product for deploying a location based applications providing crowdsourced structured points of input for data entry, the computer program product comprising:

a non-transitory computer readable storage medium comprising a device having computer readable program code embodied therewith, the computer readable program code comprising:

computer usable program code for selecting different combinations of different location based application components by different end users from over a computer communications network in order to define a different deployable application for each of the different end user;

computer usable program code for storing by each of the different end users, a corresponding one of the different deployable applications in a deployable application repository from which each deployable application is downloaded and consumed by others of the different end users and associating during the storing, a map with a corresponding one of the location based components in each deployable application for each corresponding one of the different end users;

computer usable program code for defining for each map, a point of input into which structured data defined by the point of input as being a pre-defined selection of selectable data is received in connection with a single location on the map irrespective of a particular one of the combinations of the different location based components of an associated one of the different deployable applications;

computer usable program code for deploying each deployable application to a corresponding one of the different end users; and, computer usable program code for subsequent to the deploying of each deployable application to a corresponding one of the different one of the end users, in each one of the deployable applications that has been deployed to a corresponding one of the different one of the end users, receiving from a corresponding one of the different end users, a selection through the point of input of one of the selectable data presented in connection with the single location on the map and aggregating each selection by each corresponding one of the different end users in a repository in association with the single location on the map and thereafter, in response to a request by a new one of the different end users to deploy a particular one of the deployable applications to a mobile device of the new one of the different end users, deploying the particular one of the deployable applications with the single location on the map and all aggregated selections of the selectable data from others of the different end users as stored in connection with the deployable application.

10. The computer program product of claim 9, wherein the program further comprises:

computer usable program code for selecting a template of a pre-determined arrangement of location based application components; and, computer usable program code for modifying the pre-determined arrangement in the template to include a different arrangement of location based application components.

11. The computer program product of claim 9, wherein the point of input includes a drop down box accepting data input from amongst a list of pre-defined choices of structured data.

12. The computer program product of claim 9, wherein the point of input comprises a set of radio buttons accepting data input from amongst a list of pre-defined choices of structured data.

* * * * *